Figure 1:
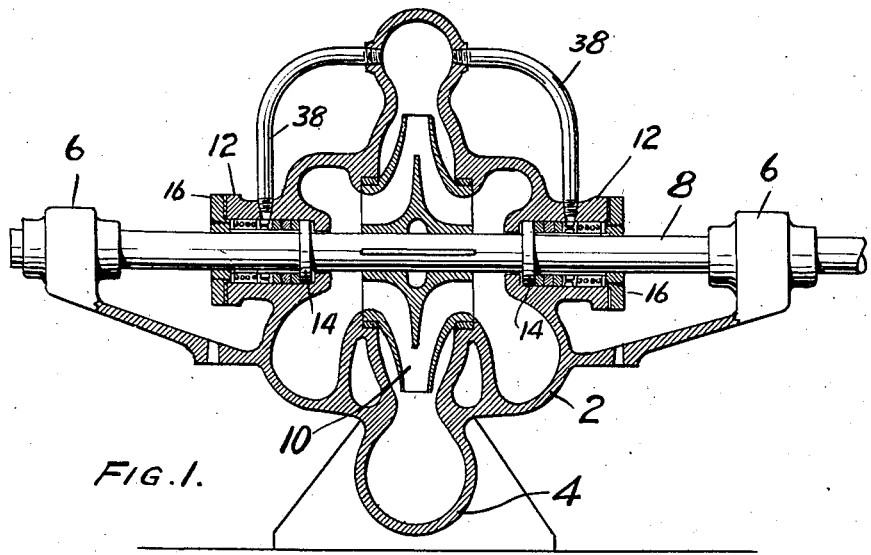

April 25, 1933.　　　J. N. WALTON　　　1,905,772

PACKING MEANS FOR SHAFTS

Filed Aug. 27, 1929

WITNESS:

INVENTOR
Julian N. Walton
BY
　　　ATTORNEYS.

Patented Apr. 25, 1933

1,905,772

UNITED STATES PATENT OFFICE

JULIAN N. WALTON, OF BROOKLYN, NEW YORK, ASSIGNOR TO THE ANCHOR PACKING COMPANY, OF PHILADELPHIA, PENNSYLVANIA, A CORPORATION OF NEW JERSEY

PACKING MEANS FOR SHAFTS

Application filed August 27, 1929. Serial No. 388,649.

This invention relates to packing means for shafts more particularly adapted for the prevention of leakage of liquid about the shaft of a high speed rotary pump or turbine.

Packing of shafts against undesired leakage of liquid has heretofore been accomplished by providing a stuffing-box about the shaft where it passed from the casing and compressing annular packing against the inner walls of the stuffing-box and about the shaft by axial pressure produced by an adjustable gland. At low rotative speeds of the shaft such packing is quite satisfactory. But at the high speeds of operation of rotary pumps or turbines such pressure upon the packing is required to eliminate undesired leakage that the shafts are cut thereby resulting in their destruction within a relatively short time, particularly if the gland is injudiciously tightened. Replaceable sleeves surrounding such shafts have been provided to take the wear but the replacement necessitates dismantling of the machine and resultant waste of time. Also, by reason of the friction between the shaft, or sleeve, and packing, the efficiency of the mechanism is considerably lowered.

It is the broad object of the present invention to provide an arrangement for packing shafts operating at high speeds whereby the above objectionable features are eliminated; that is, whereby wear is reduced increasing the intervals between repacking, whereby such repacking is greatly facilitated, and whereby friction is minimized. Detailed objects, relating primarily to the control of desired leakage, will become apparent from the following description.

Figure 2:
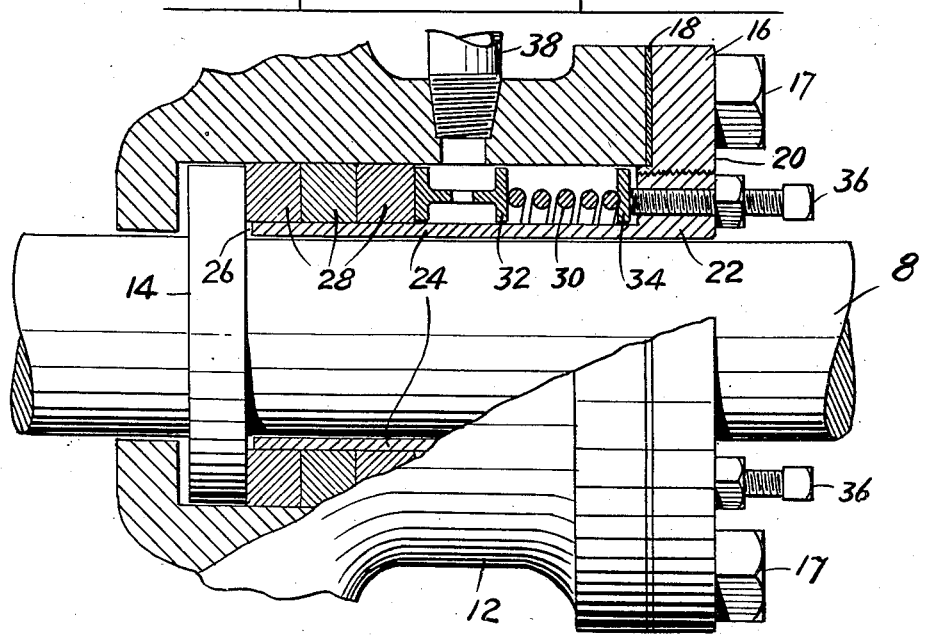

In the drawing:

Fig. 1 is a vertical axial section through a rotary impeller pump showing the application of the invention; and Fig. 2 is an enlarged detail section of the stuffing-box.

The numeral 2 indicates the casing of a high speed impeller pump made, as usual, in upper and lower sections and provided with the usual discharge volute 4. Bearings 6 supported by end extensions of the casing serve to mount a shaft 8 carrying the impeller 10. Stuffing-boxes 12 surround shaft 8 where it passes through the casing.

Referring to Fig. 2 in which details of the packing arrangements are shown, an annular ring 14 is shown as either shrunk or threaded upon the shaft, or formed integral therewith, adjacent the inner end of a stuffing-box, forming an outwardly facing bearing shoulder upon the shaft and rotating therewith free from the stuffing-box walls. A two part gland, designated generally by the numeral 16, is clamped by bolts 17 to the outer end of the stuffing-box, a gasket 18 being interposed to prevent leakage. This gland comprises an annular ring 20 in which is threaded an annular member 22 having a sleeve-like extension 24 extending along the shaft in spaced relation therewith with its inner end 26 approximating the annular ring 14. Rotation of member 22 within ring 20 serves to move it axially to adjust the clearance between end 26 and the ring 14 for a purpose hereafter described. The clearance between the shaft and the sleeve 24 is preferably of the order of about $\frac{1}{32}''$.

Located between sleeve 24 and the annular wall of the stuffing-box are packing rings (or a plurality of convolutions of packing material), 28. It is found that any type of flexible packing, either soft, such as asbestos packing, or hard, such as metallic packing, may be used. Preferably, the packing may consist of a plurality of split rings with overlapping edges whereby initial packing or replacement is facilitated. The packing is urged axially against ring 14 and expanded against the sleeve 24 and the annular wall of the stuffing-box by a spring 30 between which and the packing is interposed a lantern-ring 32 preferably formed in two parts to facilitate replacement. The outer end of the spring bears against a ring 34 which is axially adjustable by screws 36 in order to change the tension of the spring.

The inner annular wall of the stuffing-box is preferably fluted axially so as to prevent rotation of the packing rings during the rotation of the shaft. Other means may, of course, be provided to eliminate possibility of rotation.

A pipe 38 serves to lead liquid from the high pressure side of the system or other suitable source of pressure into the stuffing-box at the position of the lantern-ring 32.

It will be seen that during the operation of the device the only portion of the packing bearing upon a rotating surface is that adjacent the ring 14. And even here there is no actual contact, since a capillary film of liquid enters between the packing and the ring due both to passage of liquid from the casing about the periphery of the ring and the liquid leaking past the packing from conduit 38 into the space between end 26 of the sleeve and the ring. During rotation, the liquid will be thrown centrifugally outward whereby the film is maintained from the leakage from conduit 38, the direction of flow being rather into the casing than outwardly therefrom.

Inasmuch as the packing and sleeve 24 do not rotate, there is little leakage around end 26 and between the shaft and sleeve, the leakage being due solely to the porosity of the packing. Axial adjustment of the sleeve serves to adjust the opening at 26 and control this leakage, as does also adjustment of the spring tension, so that only that is permitted which is desirable to maintain the film and fill the space between the shaft and sleeve.

Because of the existence of the film between the packing and ring 14, there is very little wear on the packing and a minimum of friction, since only that due to fluid is present. Any wear which does occur is compensated by spring 30, the tension of which may be adjusted to the desired degree. The flexible packing which is used is shaped under the pressure of spring 30 and the liquid from conduit 38 so as to conform to the bearing surface of ring 14 and thereby effect the maintenance of an even film of liquid at that surface.

By using packing rings and lantern-ring of split form it will be obvious that replacement is very readily effected since it is only necessary to free the gland and slide the same outwardly on the shaft with the packing rings, lantern-ring, spring, etc. to a position of ready access.

In the following claims it will be understood that "outward" refers to the direction from the body of liquid being packed against through the stuffing box.

What I claim and desire to protect by Letters Patent is:

1. In combination, a stuffing-box, a shaft extending through the stuffing-box and having an annular bearing shoulder, a gland having a sleeve portion extending about the shaft towards the bearing shoulder, annular packing located between the sleeve portion and the stuffing-box walls and pressed towards the shoulder, and means for introducing liquid under pressure to the side of the packing opposite the bearing shoulder.

2. In combination, a stuffing-box, a shaft extending through the stuffing-box and having an annular bearing shoulder, a gland having a sleeve portion extending about the shaft towards the bearing shoulder, said sleeve portion being adjustable towards or away from the bearing shoulder, annular packing located between the sleeve portion and the stuffing-box walls and pressed towards the shoulder, and means for introducing liquid under pressure to the side of the packing opposite the bearing shoulder.

3. In combination, a stuffing-box, a shaft extending through the stuffing-box and having an annular bearing shoulder, a gland having a sleeve portion extending about the shaft towards the bearing shoulder, said sleeve portion being adjustable towards or away from the bearing shoulder, annular packing located between the sleeve portion and the stuffing box walls, a spring pressing the packing towards the shoulder, and means for introducing liquid under pressure to the side of the packing opopsite the bearing shoulder.

4. In combination, a stuffing-box, a shaft extending through the stuffing-box and having an annular bearing shoulder, a gland having a sleeve portion extending about the shaft towards the bearing shoulder, said sleeve portion being adjustable towards or away from the bearing shoulder, annular packing located between the sleeve portion and the stuffing box walls, a spring pressing the packing towards the shoulder, means for adjusting the tension of the spring, and means for introducing liquid under pressure to the side of the packing opposite the bearing shoulder.

In testimony of which invention, I have hereunto set my hand, at Manheim, Pa., on this 24th day of August, 1929.

JULIAN N. WALTON.